United States Patent
Barr et al.

(10) Patent No.: US 8,606,576 B1
(45) Date of Patent: Dec. 10, 2013

(54) COMMUNICATION LOG WITH EXTRACTED KEYWORDS FROM SPEECH-TO-TEXT PROCESSING

(71) Applicants: John Mathias Barr, Kitchener (CA); Geon Hyuk Park, Kitchener (CA)

(72) Inventors: John Mathias Barr, Kitchener (CA); Geon Hyuk Park, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/667,987

(22) Filed: Nov. 2, 2012

(51) Int. Cl.
*G10L 15/26* (2006.01)
*H04M 1/64* (2006.01)

(52) U.S. Cl.
USPC ..... 704/235; 704/251; 379/88.01; 379/88.08; 379/88.11

(58) Field of Classification Search
USPC ............ 704/235, 236, 251; 379/88.01, 88.14, 379/88.19, 88.21, 88.22, 88.08, 88.11; 455/412.1, 415
See application file for complete search history.

(56) References Cited

U.S. PATENT DOCUMENTS

| | | | |
|---|---|---|---|
| 6,122,665 A * | 9/2000 | Bar et al. ....................... 709/224 |
| 7,072,684 B2 | 7/2006 | Gusler et al. |
| 7,200,556 B2 | 4/2007 | Aktas et al. |
| 7,451,084 B2 | 11/2008 | Funakura |
| 7,539,086 B2 | 5/2009 | Jaroker |
| 7,599,554 B2 | 10/2009 | Agnihotri et al. |
| 7,672,845 B2 * | 3/2010 | Beranek et al. ............... 704/251 |
| 7,685,102 B2 | 3/2010 | Adelman et al. |
| 7,844,460 B2 | 11/2010 | Charlier et al. |
| 7,937,268 B2 | 5/2011 | Kirkland et al. |
| 7,991,128 B2 * | 8/2011 | Abernethy et al. ........ 379/88.24 |
| 8,086,462 B1 * | 12/2011 | Alonso et al. .................. 704/275 |
| 8,180,027 B1 * | 5/2012 | Magnuson et al. ........ 379/88.22 |
| 8,300,776 B2 * | 10/2012 | Davies et al. .............. 379/88.11 |
| 8,335,830 B2 * | 12/2012 | Jablokov et al. .............. 709/206 |
| 2005/0010407 A1 | 1/2005 | Jaroker |
| 2005/0086205 A1 * | 4/2005 | Franciosa et al. ................. 707/3 |
| 2005/0232249 A1 * | 10/2005 | Mishra .......................... 370/352 |
| 2006/0101012 A1 * | 5/2006 | Carson et al. ..................... 707/4 |
| 2007/0174388 A1 | 7/2007 | Williams |
| 2008/0039966 A1 | 2/2008 | Redgewell et al. |
| 2008/0161948 A1 | 7/2008 | Bodin et al. |
| 2008/0300872 A1 * | 12/2008 | Basu et al. ..................... 704/235 |
| 2008/0304633 A1 * | 12/2008 | Kochanowska ........... 379/88.08 |
| 2008/0316888 A1 * | 12/2008 | Reifman ......................... 369/69 |
| 2009/0075631 A1 * | 3/2009 | Lyle et al. ................. 455/412.2 |
| 2009/0119100 A1 * | 5/2009 | Akella et al. ................. 704/235 |
| 2009/0264117 A1 * | 10/2009 | Hsieh et al. .................. 455/418 |
| 2010/0179811 A1 | 7/2010 | Gupta et al. |
| 2011/0202559 A1 * | 8/2011 | Stiers ........................... 707/771 |
| 2011/0264444 A1 * | 10/2011 | Morisaki .......................... 704/9 |

(Continued)

*Primary Examiner* — Martin Lerner
(74) *Attorney, Agent, or Firm* — Shumaker & Sieffert, P.A.

(57) ABSTRACT

A computing device may extract keywords from a phone call or other audio communication and later display those keywords in a call log or in a caller ID. In one example, a method performed by at least one processor of a first computing device includes receiving speech inputs during an audio communication between the first computing device and a second device. The method further includes performing speech-to-text processing on the speech inputs to generate text based on the speech inputs. The method further includes performing keyword extraction processing on the text to generate one or more keywords based on the text, that score highly as relevant indicators of the audio communication, based on one or more keyword extraction criteria. The method further includes storing the one or more keywords in association with identifying information associated with the second device. The method further includes outputting the one or more keywords, in association with the identifying information associated with the second device, at a display of the first computing device.

24 Claims, 5 Drawing Sheets

(56) References Cited

U.S. PATENT DOCUMENTS

2012/0020465 A1* 1/2012 Davies et al. ............. 379/88.01
2012/0191730 A1* 7/2012 Parikh et al. ................ 707/754
2012/0237006 A1* 9/2012 Kim ........................... 379/88.01
2012/0264490 A1* 10/2012 Bocking et al. ............... 455/566
2012/0295602 A1* 11/2012 Einbinder et al. ............. 455/417
2013/0019176 A1* 1/2013 Miyashita et al. ............ 715/728

* cited by examiner

COMMUNICATION LOG WITH EXTRACTED KEYWORDS FROM SPEECH-TO-TEXT PROCESSING

BACKGROUND

Many mobile computing devices such as smartphones and tablet computers have touchscreens that provide graphical outputs and enable users to enter inputs via touch gestures and/or virtual or hardware keyboards or buttons. Mobile computing devices may also provide audio outputs and enable user inputs via virtual or hardware keyboards and buttons. Mobile computing devices may provide a variety of functions including telephony, email, text messaging, and web browsing functions. A mobile computing device may keep records of incoming and outgoing telephone calls, emails, and text messages, and may provide options to display or modify those records.

SUMMARY

In one example, a method is performed by at least one processor of a first computing device. The method includes receiving one or more speech inputs during an audio communication between the first computing device and a second device. The method further includes performing speech-to-text processing on the one or more speech inputs to generate text based on the one or more speech inputs. The method further includes performing keyword extraction processing on the text to generate one or more keywords based on the text, that score highly as relevant indicators of the audio communication, based on one or more keyword extraction criteria. The method further includes storing the one or more keywords in association with identifying information associated with the second device. The method further includes outputting the one or more keywords, in association with the identifying information associated with the second device, at a display of the first computing device.

In another example, a computing device includes at least one processor, a computer-readable storage medium, and machine-readable code stored on the computer-readable storage medium. The machine-readable code includes instructions that are executable by the at least one processor to receive a speech input. The machine-readable code further includes instructions that are executable by the at least one processor to perform speech-to-text processing on the speech input to generate text based on the speech input. The machine-readable code further includes instructions that are executable by the at least one processor to perform keyword extraction processing on the text to generate one or more keywords based on the text. The machine-readable code further includes instructions that are executable by the at least one processor to store the one or more keywords in association with identifying information associated with a contact. The machine-readable code further includes instructions that are executable by the at least one processor to output a graphical depiction of the one or more keywords and the contact at a display of the computing device.

In another example, a computer-readable storage medium includes instructions executable by at least one processor of a computing device to receive a speech input. The instructions are further executable by the at least one processor to perform speech-to-text processing on the speech input to generate text based on the speech input. The instructions are further executable by the at least one processor to perform keyword extraction processing on the text to generate one or more keywords based on the text. The instructions are further executable by the at least one processor to store the one or more keywords in association with identifying information associated with a contact. The instructions are further executable by the at least one processor to output a graphical depiction of the one or more keywords and the contact at a display of the computing device.

The details of one or more embodiments are set forth in the accompanying drawings and the description below. Other features, objects, and advantages will be apparent from the description and drawings, and from the claims.

BRIEF DESCRIPTION OF DRAWINGS

The various described features are not drawn to scale and are drawn in a simplified form in which one or more features relevant to the present application are emphasized. Like reference characters denote like elements throughout the figures and text.

DETAILED DESCRIPTION

In general, this disclosure is directed to a computing device that extracts keywords of a conversation in an audio communication, such as a telephone call, that may be useful indicators of topics of the conversation, and that displays the keywords along with contact identification in a communication log entry associated with that audio communication in a call log or a combined communication log. The user can then see the keywords in the call log along with the other information, such as the name, phone number, and/or thumbnail image of the other participant in the phone call, the date and time of the call, and whether it was an incoming or outgoing call, for example. The user may therefore look through the call log or communication log and, at a glance, be reminded of a few keywords from the conversation or other communication, which may aid the user in recalling the context and substance of the phone call or other communication, beyond what may be possible from a more traditional call log that merely lists contacts and times for each phone call. Additionally, when another caller uses a device to initiate a phone call to the user's computing device and that caller has a log entry in the communication log, the computing device may display the keywords from the last conversation along with or as part of the caller identification ("caller ID") while the computing device is ringing or otherwise in the process of providing a notification of an incoming phone call. This inclusion of log entry keywords from a prior conversation as part of the caller ID may enable the user to glance at the log entry keywords displayed with the caller ID and quickly be reminded of the last conversation with the current caller before answering the phone call. This keyword extraction system may be made available to a user on an optional basis, so that the computing device will not use the keyword extraction system unless the user decides to activate the keyword extraction system.

Figure 1:
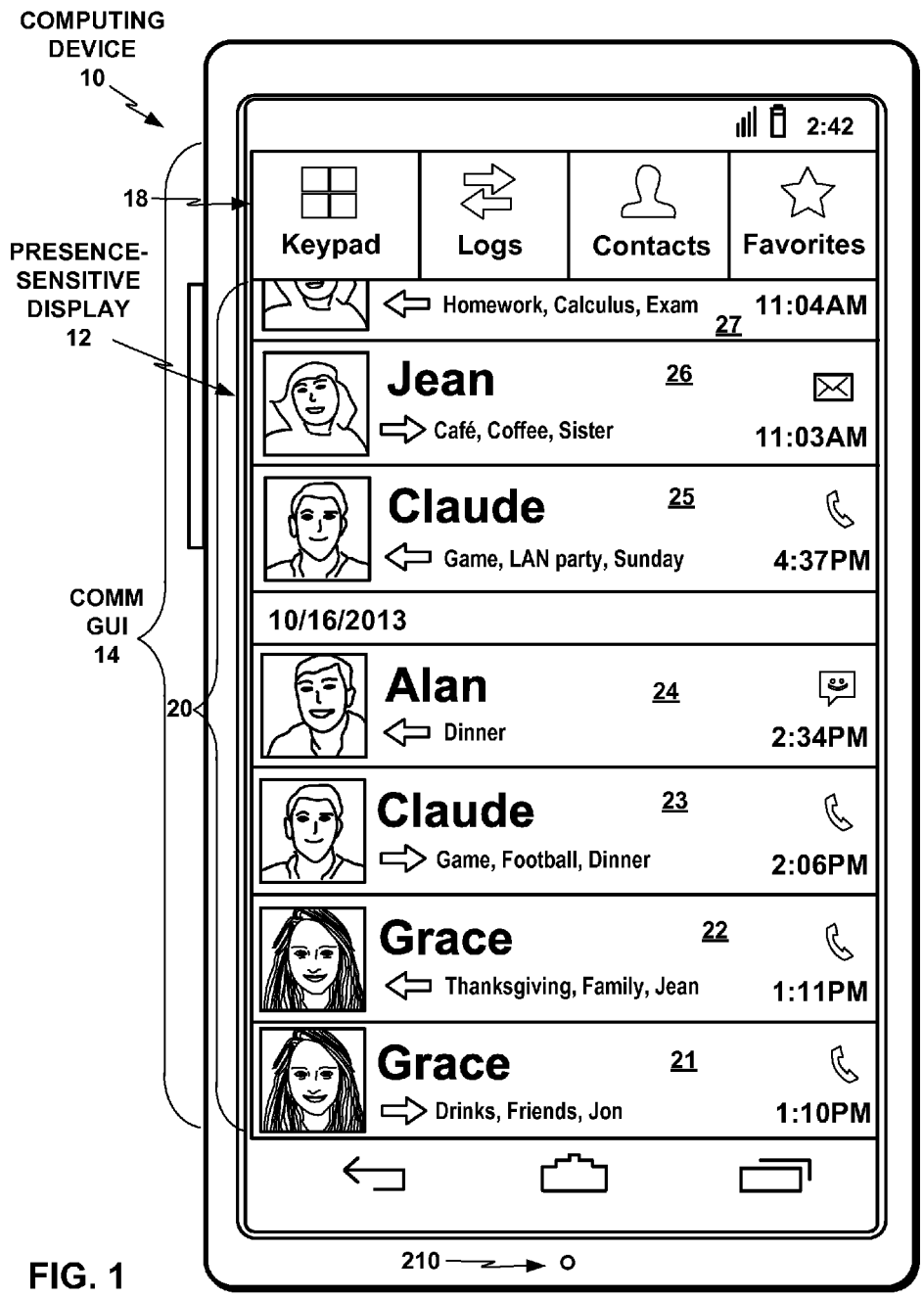
FIG. 1 is a front view diagram illustrating an example computing device that may be configured to display a communication log that includes one or more keywords associated with each communication log entry, in accordance with illustrative aspects of this disclosure.

FIG. 1 is a front view diagram illustrating an example computing device 10 that may be configured to display a communication log that includes one or more keywords associated with each communication log entry, in accordance with illustrative aspects of this disclosure. Computing device 10 may be a smartphone, a tablet computing device, a laptop or desktop computing device, a computing device in a wearable form factor such as a wristwatch or glasses computing device, or other type of computing device (e.g., other type of mobile computing device). Computing device 10 includes a presence-sensitive display 12, such as a touchscreen, in this example. Computing device 10 is outputting a graphical user interface (GUI) for a communication application, e.g., communication application GUI 14, for display at presence-sensitive display 12. Communication application GUI 14 includes a display option panel 18 along an upper region thereof, and a communication log 20, which includes a list of example communication log entries 21, 22, 23, 24, 25, 26, 27 ("communication log entries 21-27") (where the reference numerals are not intended as part of the output displayed at presence-sensitive display 12). Each of the communication log entries 21-27 displays information recorded that relate to a previous communication, such as a phone call, a text message, an email, etc., that computing device 10 placed, received, or was involved in, where the information includes keywords extracted from the communication. This may, in some instances, include keywords extracted from a conversation associated with a phone call or other audio communication, or extracted from a text-based message such as an email or a text message.

For example, communication log entry 21 may represent a phone call or other audio communication that computing device 10 previously placed, received, or was involved in, and computing device 10 may have generated communication log entry 21 based on the phone call. This and certain other examples below are discussed in terms of a phone call as one example of an audio communication, with the understanding that all of the discussion of a phone call may apply equally to any other audio communication. Other examples of an audio communication are also discussed below. During the phone call, computing device 10 may have performed speech-to-text processing on speech inputs to generate text based on the speech inputs. This may apply to speech inputs made by the user of computing device 10 received via a microphone 210 and/or to speech inputs received from a participant on the other end of the phone call, whose speech inputs may be received via a signal received by computing device 10 from a remote resource, such as via a wireless network, for example. Receiving the speech inputs from the remote participant in the phone call may involve receiving a signal through a wireless or hard-line network interface and may involve decoding the signal into a speech input, for example. Any acoustic signal from any participant of a phone call may include a speech input that may be processed for keywords in various implementations.

In either case, computing device 10 may perform speech-to-text processing on the speech inputs, where the speech-to-text processing may result in a set of text that represents the speech inputs and that may form a transcription of the speech inputs. Computing device 10 may use any of a wide variety of speech-to-text processing techniques or methods for generating text based on the speech inputs, from relatively simple to highly sophisticated techniques. For example, computing device 10 may use a speech-to-text processing system trained with natural language processing (NLP) or other machine learning or pattern recognition techniques. For example, computing device 10 may have stored thereon or have access to an NLP engine that may be trained with a large corpus of spoken word input, and that may model speech inputs using Hidden Markov Modeling (HMM) and/or extensions to HMM or any other modeling techniques. Computing device 10 may use separate systems or stages for modeling audio properties of an audio signal, and for modeling the correspondence of the audio properties of the audio signal with language properties of a selected spoken language, and each of these systems or stages may be individually trained using machine learning or pattern recognition techniques.

Computing device 10 may include or make use of language models of any of a large variety of different languages in the process of selecting the keywords, from English, Chinese, Spanish, French, German, Japanese, or any other language, including those with lower populations of speakers or lower rates of anticipated usage in a particular market. Computing device 10 may be set to an initial default language to use for its language models for performing keyword extraction processing, which may be set according to a market the computing device is originally sold in, but may also enable options for the user to select from any of a wide variety of default languages to specify. Computing device 10 may also be enabled to detect if a phone call or other communication is in a different language, and switch to using a language model for the detected language. Computing device 10 may also, on an opt-in basis if selected by the user, cooperate with remote resources such as a server-side speech-to-text processing application for performing or contributing to at least a portion of the speech-to-text processing.

Computing device 10 may make the keyword extraction system available to a user on an optional basis, so that the computing device 10 will not use the keyword extraction system unless the user opts to allow the computing device 10 to use the keyword extraction system. Computing device 10 may make the keyword extraction system available as an opt-in system, so that the keyword extraction system is disabled or not installed by default, and only becomes enabled or installed if the user affirmatively selects an option to use the keyword extraction system. The keyword extraction system may include documentation and tutorials to help users understand how it works and gain a complete understanding of the system prior to deciding whether to turn it on or begin to use it. The keyword extraction system may also include privacy controls to give a user options regarding usage of the keyword extraction system, such as to set a time limit on how long the keywords are stored, as one example.

Computing device 10 may also make use of any of a sophisticated body of keyword extraction techniques that have been developed in other areas, such as search, and context-specific online advertising, for example, for identifying and picking out highly relevant individual words from a body of text. Computing device 10 may use any of a wide variety of speech-to-text processing techniques for generating text based on the speech inputs. Once it has generated text based on the speech inputs, computing device 10 may perform keyword extraction processing to the text to generate one or more keywords based on the text, e.g., by identifying highly relevant individual words from the text, or words that score highly on a test for how relevant, characteristic, or descriptive they are relative to the text as a whole. The keyword extraction processing techniques include techniques to score individual words in the text, e.g., keyword candidates, as relevant indicators of the audio communication, based on one or more keyword extraction criteria. Various examples of such keyword extraction criteria for scoring the indicative relevance of words in a text, identifying words that score highly on these keyword extraction criteria, and generating keywords from such highly scoring keyword candidates, are described below.

Computing device 10 may use any of a wide variety of keyword extraction processing techniques. For example, keyword extraction processing techniques used by computing device 10 may have access to a dictionary in a selected human language with each of the words in the dictionary tagged according to its relative frequency in common usage of the language. The keyword extraction processing techniques used by computing device 10 may then give weight to a potential keyword based on how relatively uncommon the word is in the language, how many times the word is used in the conversation in the audio communication, what other words the word is used with, whether the word is used by both (or at least two) participants in the conversation in the audio communication, or whether or how often the word is used as part of a phrase, and how relatively uncommon the phrase is, for example. Keyword extraction processing techniques may also use statistical methods to model how uncommonly significant a keyword candidate is likely to be.

For example, the English word "the" is extremely common and might be ignored as a potential keyword candidate no matter how frequently it appears in a conversation. On the other hand, the English word "basketball" may be somewhat uncommon in ordinary conversations, and three or four occurrences of the word "basketball" within a few minutes of conversation may be statistically very uncommon relative to ordinary usage, and an excellent indication that the word "basketball" is a valuable contextual reminder of the phone call (or other audio communication) and should be highly ranked as a keyword candidate. Other words such as "diffeomorphism" may be even more uncommon in ordinary usage, such that only two or even only one occurrence of such a very uncommon word may indicate that it is a valuable contextual reminder of the phone call and is highly likely to distinguish the phone call in the user's memory, and should be highly ranked as a keyword candidate. After the phone call is over, or on an ongoing basis during the phone call, computing device 10 may compare the most highly ranked keyword candidates and may select the most highly ranked candidates as the keywords to retain, or may apply additional criteria before selecting a finalized list of keywords.

The keyword extraction techniques executed by computing device 10 may also include techniques for disambiguating potentially ambiguous words. For example, computing device 10 may transcribe or otherwise detect the English word "java" from a phone call, and may then compare the context of surrounding words to disambiguate the intended usage of the word "java." If computing device 10 detects the word "java" in close proximity to the words "beans" or "coffee," it may disambiguate the intended usage of the word to a meaning associated with coffee, while if computing device 10 detects the word "java" in close proximity to the word "compile" or the phrase "garbage collection," it may disambiguate the intended usage of the word to a meaning associated with the programming language Java. If, instead, computing device 10 detects the word "java" in close proximity to the words "Indonesia" or "Borneo", it may disambiguate the intended usage of the word to a meaning associated with the island of Java. Computing device 10 may also employ ongoing, flexible disambiguation with reference to continuous detection of words after an initial disambiguation, such that, for example, if it initially detects the word "java" and then the words "beans" or "coffee" and disambiguates the intended meaning to refer to coffee, but soon afterward detects the words "NetBeans" or "CoffeeScript", it may revise the disambiguation to refer instead to the programming language.

Keyword extraction processing techniques may also incorporate training based on natural language processing (NLP) or other machine learning or pattern recognition techniques, for example. Computing device 10 may also use techniques that incorporate processing of the audio signal together with the keyword extraction processing techniques, rather than only applying the keyword extraction processing techniques to the resulting text output from the speech-to-text processing. For example, the keyword extraction processing may also use clues from the audio signal, such as an inflection or tone of voice with which a word is spoken. Such a vocal emphasis on a particular word may be interpreted by adding weight to that word as a keyword candidate. Keyword extraction processing based directly on the audio signal may also incorporate statistical modeling, training using machine learning, or pattern recognition techniques, to name a few examples.

Computing device 10 may closely coordinate the speech-to-text processing and the keyword extraction processing to minimize the creation or storage of extensive text transcriptions of a conversation, in one example. In one implementation, computing device 10 may delete the text transcription of a phone call as soon as the phone call is terminated, or as soon as the keywords from the phone call are extracted. Computing device 10 may also continuously delete the text transcriptions during the phone call in a rolling process with keyword extraction. This deletion of text transcriptions may be done according to a certain limit on the period of time of the phone call for which the text transcriptions are kept, so that at any point in time, computing device 10 only maintains a text transcription of the previous five minutes, ten minutes, or some other interval of the phone conversation in a first-in-first-out rolling record, and continuously deletes the text transcription for the phone call prior to the threshold of that interval, as the phone call progresses. In another implementation, computing device 10 may limit the text transcription to a maximum number of words, or a maximum number of characters, and continuously delete the transcription from the oldest remaining portion as it continues to add transcriptions of the newest portions of the conversation, also in a first-in-first-out rolling record as the phone call progresses.

If computing device 10 accesses any server-side resources to execute any of the functions involved in speech-to-text processing or keyword extraction processing, computing device 10 may apply an initial processing function to send only promising keyword candidates, e.g., words that pass an initial or basic screening function for value as a potential keyword, in isolation for server-side processing, instead of strings of text. The server-side resources may then retain the keyword candidates only ephemerally, long enough to perform the processing steps and return its results to computing device 10, and then delete the data sent to it by computing device 10. If a particular implementation uses the option of accessing server-side resources, computing device 10 may refrain from accessing the server-side resources by default, and only enable accessing the server-side resources if a user opts to do so in selectable user settings. In some implementations, computing device 10 may include sufficient processing resources, and communication log application 120 may include sufficient algorithmic sophistication, to perform all required speech-to-text and keyword extraction processing with high performance and without any compelling advantage by accessing server-side resources. Computing device 10, as the device that originally receives the physical acoustic signal of the user's speech inputs, may have access to the highest signal quality possible for the speech inputs, which may contribute to the quality of results of NLP and keyword extraction processing performed by computing device 10 as opposed to a server-side resource or other computing device that processes a downstream audio signal originally generated by computing device 10.

In other implementations, computing device 10 may employ an ongoing intermediate analysis of candidate keywords to enable an even lighter use of stored transcriptions. That is, computing device 10 may evaluate each word as a potential candidate keyword and then either store or delete that word, and continuously delete most of the words from the text transcription within a few seconds of their transcription. Computing device 10 may then only retain in storage a minority of the words in isolation as potential candidate keywords, and subsequently may also perform additional keyword candidate processing. For example, computing device 10 may initially select relatively uncommon words as potential candidate keywords, and only retain these relatively uncommon words for more than a few seconds past their original creation. Computing device 10 may subsequently compare the frequency of these retained words, and promote potential candidate keywords that are used several times in the phone call, while eventually discarding potential candidate keywords that do not reappear after their initial retention, as an illustrative example of using an intermediate step of keyword extraction processing. Computing device 10 may expose all of these and other implementations as user options for a user to have freedom to select how much, if any, of a text transcription of the phone call is generated or retained at any point in time.

Computing device 10 may use any of a wide variety of keyword extraction processing techniques for generating text based on the speech inputs. Computing device 10 may compare a number of candidate keywords, and select one or more candidate keywords as the keywords for the conversation or other speech input or communication. Computing device 10 may select from among candidate keywords from a series of speech inputs from both the user of computing device 10 and one or more remote participants to the conversation in a phone call, and computing device 10 may select one or more keywords from among all the speech inputs as its final selections for the keywords for the conversation in that phone call.

After computing device selects one or more keywords, computing device 10 may store those keywords in a data storage component or in a memory, such as in a call log data store and/or in a caller ID data store. Computing device 10 may later retrieve the keywords from storage and/or memory, such as when computing device 10 implements a call log or caller ID function. Computing device 10 may output a graphical representation or depiction of the one or more selected keywords at a display of the computing device, such as at presence-sensitive display 12. As shown in FIG. 1, and as further depicted in subsequent figures, each of the communication log entries 21-27 included in communication log 20 includes one or more keywords selected from the phone call corresponding to each of the communication log entries 21-27. As depicted in FIG. 1, computing device 10 may also associate the one or more keywords with a contact identified as a remote participant in the telephone call. Any of the one or more keywords may have originated from the remote participant in the phone call, the user of computing device 10, or both. A user may then open or scroll through communication log 20 and review the keywords associated with each phone call or other communication, and the keywords may rapidly remind the user of the subjects or context of each of the phone calls or other communications. The keywords may therefore make the communication log 20 more informative and more useful than a log of just contacts and times associated with the communications. Additional details of example computing devices are described in further detail below with respect to subsequent figures, including the example of FIG. 2.

Figure 2:
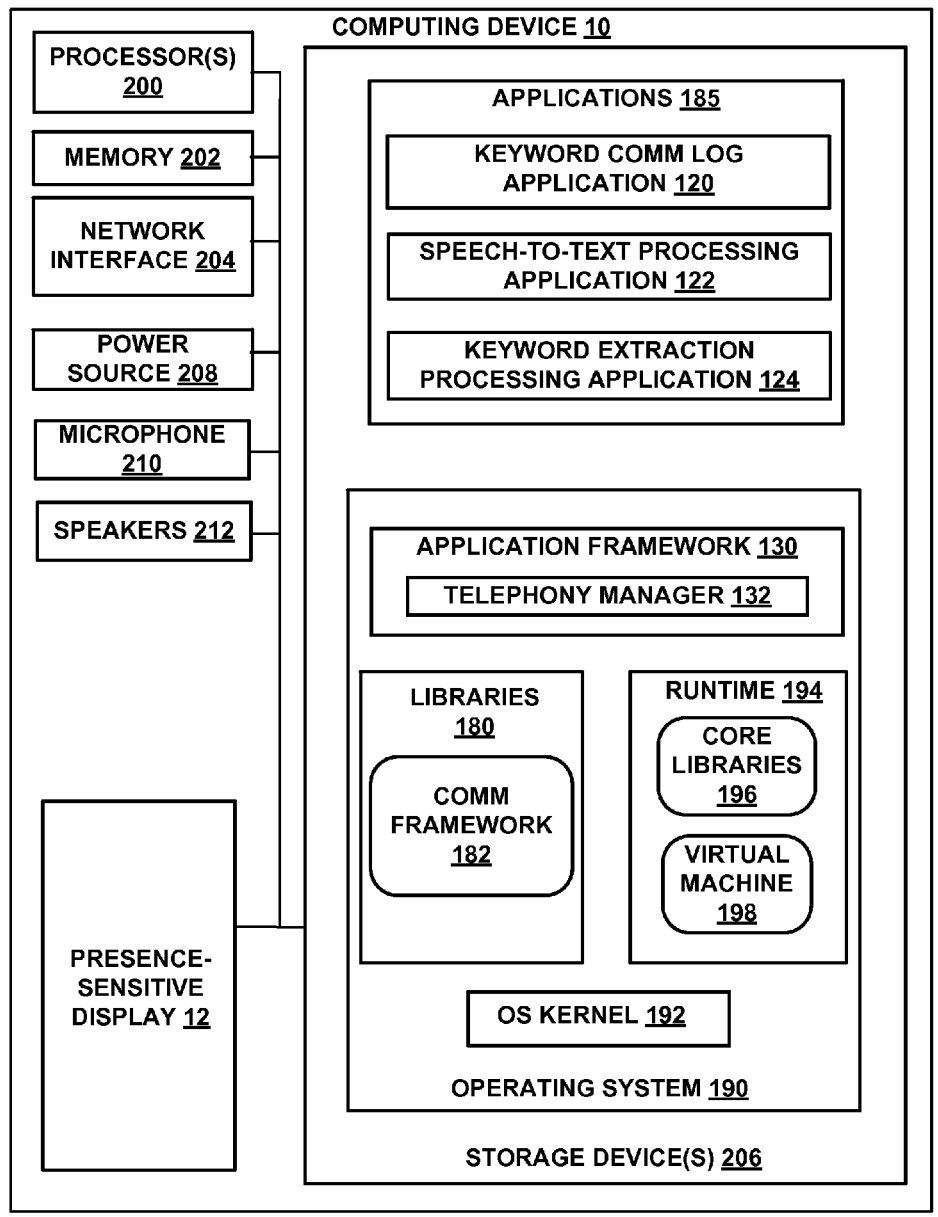
FIG. 2 is a schematic diagram of an example computing device that may be configured to output a communication log with keywords associated with log entries, in accordance with illustrative aspects of this disclosure.

FIG. 2 is a schematic diagram of an example computing device 10 that may be configured to output a communication log with keywords associated with log entries, in accordance with illustrative aspects of this disclosure. Computing device 10 in FIG. 2 is an example implementation of computing device 10 in FIG. 1. Computing devices of the present disclosure may be implemented in a variety of forms, such as a smartphone, a tablet computing device, a wearable computing device, to name just a few examples. Some components of example computing device 10 are depicted in dashed lines to emphasize that they may be optional in different implementations, and other implementations may include additional components beyond those depicted in FIG. 2, or omit one or more of the components depicted in FIG. 2.

Computing device 10 may include various components including one or more processors 200, memory 202, a network interface 204, one or more data storage devices 206, power source 208, one or more microphones 210, one or more speakers 212, and presence-sensitive display 12, which may be a touchscreen or other presence-sensitive display. Each of the components 200, 202, 204, 206, 208, 210, 212, and 12 may be interconnected (physically, communicatively, and/or operatively) in any of a variety of physical and/or communicative connection means for inter-component communications, and each one may refer to one or more components.

Computing device 10 has operating system 190 stored on one or more storage devices 206, and that may execute on one or more processors 200. Operating system 190, in various examples, may control aspects of the operation of components of computing device 10, and facilitate operation of higher-level software applications. Computing device 10, in this example, has applications 185 that may include a keyword communication log application 120 that is executable by computing device 10, for operating a communication log with keywords extracted from the communications, as described above. Keyword communication log application 120 may include executable instructions to perform or facilitate any or all of the keyword extraction and outputting features and behavior discussed in this disclosure, or any other aspects of this disclosure. Applications 185 may also include speech-to-text processing application 122 and/or keyword extraction processing application 124, either as separate applications that may interact with or be used together with keyword communication log application 120, or as libraries that may be accessed or used by keyword communication log application 120, or as portions of keyword communication log application 120, for example.

Operating system 190, in one example, may facilitate the interaction of keyword communication log application 120 with speech-to-text processing application 122, keyword extraction processing application 124, and/or with any or all of processors 200, memory 202, network interface 204, data storage device 206, power source 208, one or more microphones 210, one or more speakers 212, and presence-sensitive display 12. Keyword communication log application 120 may, in some examples, include executable instructions to perform speech-to-text processing on a speech input received by a computing device to generate text based on the speech input. Keyword communication log application 120 may also include executable instructions to perform keyword extraction processing on the text to generate one or more keywords based on the text. Keyword communication log application 120 may also include executable instructions to output a graphical depiction of the one or more keywords at a display of the computing device. Keyword communication log application 120 may further include executable instructions to perform or facilitate any or all of the features or behavior discussed in this disclosure, or any other aspects of this disclosure.

Keyword communication log application 120 may be an independent application or application process, and keyword communication log application 120 may use data from other resources such as audio data from microphone 210 and/or from a telephony application, in some examples. Keyword communication log application 120 may also be portions of executable code within a single application or application process, in some examples. Part or all of the functions of keyword communication log application 120 may also be performed, supported, or facilitated by portions of the operating system 190, as further described below. Operating system 190, in one example, may facilitate the interaction of keyword communication log application 120 with any or all of processors 200, memory 202, network interface 204, data storage device 206, power source 208, and/or presence-sensitive display 12.

Keyword communication log application 120 may include program instructions and/or data that are executable by computing device 10 or by at least one of the one or more processors 200 of computing device 10. For example, application 120 may include computer-executable software instructions that cause computing device 10 to perform any one or more of the operations and actions described in the present disclosure. In various examples, operating system 190 and keyword communication log application 120 may include code and/or data that are stored on one or more data storage devices 206 and that are read and executed or processed by one or more processors 200, and may in the process be stored at least temporarily in memory 202.

In the illustrative implementation of computing device 10 depicted in FIG. 2, operating system 190 may include an operating system kernel 192, which may include various device drivers, kernel extensions, and kernel modules, for example. Operating system 190 may also include or interact with a set of libraries 180, which may include various more or less standard, specialized, open source, and/or proprietary libraries. These may include a specialized library, such as communication framework 182, that may perform or support functions of extracting keywords from phone calls or other communications and displaying the keywords in a communication log or a caller ID, in accordance with any of the examples described herein. Performing or supporting functions of extracting keywords from phone calls or other communications and displaying the keywords in a communication log or a caller ID in the operating system 190 such as with communication framework 182, rather than only at the level of a top-layer application, may enable processing at least some of the functions involved, such as performing speech-to-text processing or performing keyword extraction processing, with faster or more computationally efficient performance or other advantages in some implementations. For example, in some implementations, performing speech-to-text functions by communication framework 182 or otherwise by resources embedded in the operating system 190 may facilitate accessing and processing the audio signal of the phone call in realtime, and the computational efficiency of the speech-to-text processing.

In an illustrative implementation of computing device 10, such as that depicted in FIG. 2, operating system 190 may also include or interact with a runtime 194, which may include various core libraries 196 and/or a virtual machine 198, which may be the Dalvik virtual machine in an example implementation. Virtual machine 198 may abstract certain aspects and properties of computing device 10 and allow higher-level applications 185 to execute in the environment of virtual machine 198, so that software code in the higher-level applications 185 may be compiled into bytecode to be executed by the virtual machine 198. Computing device 10 may also have an application framework 130 that executes on top of runtime 194 and libraries 180 and that may include resources to facilitate the execution of applications 185 that execute on top of application framework 130. Other embodiments may include other elements of a software stack between the operating system kernel 192 and the top-level applications 185.

Application framework 130 may, for example, include a telephony manager 132 that itself may include executable instructions to perform or facilitate any or all of functions of extracting keywords from phone calls or other communications and displaying the keywords in a communication log or a caller ID, or any other aspects of this disclosure. Performing or supporting functions of extracting keywords from phone calls or other communications and displaying the keywords in a communication log or a caller ID in the application framework 130 such as with telephony manager 132, whether or not in combination with communication framework 182, may also enable performing at least some of the processing tasks involved with faster or more computationally efficient performance or other advantages in some implementations. Computing device 10 may perform or facilitate any speech-to-text processing, keyword extraction processing, keyword communication log display processing, or any other functions described herein with any one or all of the keyword communication log application 120, speech-to-text processing application 122, keyword extraction processing application 124, telephony manager 132 in the application framework 130, communication framework 182 in the libraries 180, or any other element of the software stack included in or operatively accessible to computing device 10.

In various examples, executable instructions for applications or software elements such as keyword communication log application 120 may be written in C, or C++, which may be executable as native code by computing device 10. In various examples, executable instructions for applications or software elements such as keyword communication log application 120 may be written in Java, then compiled to virtual-machine-executable bytecode to be executed by virtual machine 198, ultimately to be executed as native code by computing device 10 under the abstraction of virtual machine 198, as another example. In another illustrative example, executable instructions for applications or software elements such as keyword communication log application 120 may be compiled from a higher level language such as JavaScript directly into native machine code for execution by one or more processors.

In another illustrative example, libraries 180 may include the Standard C Library (libc) or another C library, which provides native support for C functions, and keyword communication log application 120 may be written in C and be supported by libc in libraries 180. In different implementations, the operating system 190 and/or the virtual machine 198 may be able to execute code written in various other languages such as Objective-C, C#, C++, Go, Python, Ruby, JavaScript, Dart, or Clojure, to name only a few non-limiting examples, either natively, or compiled into a virtual machine-executable bytecode, or compiled into an assembly language or machine code native to one or more of the processors 200 of computing device 10, for example. Various examples may not use a virtual machine, and may use applications that run natively on the computing device 10 or that use some other technique, compiler, interpreter, or abstraction layer for interpreting a higher-level language into code that runs natively on computing device 10.

Communication framework 182, libraries 180, or other aspect of operating system 190 or the software stack underlying the applications 185 may include code for providing any or all of the functionality for performing haptic feedback for emulating key edges in accordance with any of the examples described herein, and may abstract this functionality at an underlying level for applications 185. Code for implementing the functionality of any of the aspects of this disclosure may therefore be included in any level or portion of the entire software stack running on computing device 10, or that is operatively accessible to computing device 10, such as in a web application or other program executing on resources outside of computing device 10 but that interact with computing device 10, such as via HyperText Transfer Protocol (HTTP) over a wireless connection, for example.

In various examples, computing device 10 may also have various application programming interfaces (API's) that are native to operating system 190 and that run on top of operating system 190, and which are intended to provide resources that automate or facilitate higher-level applications that access the one or more API's. These one or more API's may include object libraries or other libraries, toolsets, or frameworks, and may be associated with a native programming environment for writing applications. Computing device 10 may also have a different specific organization of API's, libraries, frameworks, runtime, and/or virtual machine associated with or built on top of operating system 190 other than the example organization depicted in FIG. 2.

Higher level applications, such as keyword communication log application 120, may therefore make use of any of various abstractions, properties, libraries, or lower-level functions that may be provided by any of operating system 190, OS kernel 192, libraries 180, communication framework 182, runtime 194, core libraries 196, virtual machine 198, application framework 130, telephony manager 132, or other compilers, interpreters, frameworks, API's, or other types of resources, or any combination of the above, with which computing device 10 is configured, to enable functions such as haptic feedback for emulating key edges, and other functions as described herein.

The one or more processors 200, in various examples, may be configured to implement functionality and/or process instructions for execution within computing device 10. For example, processors 200 may be capable of processing instructions stored in memory 202 or instructions stored on data storage devices 206. Computing device 10 may include multiple processors, and may divide certain tasks among different processors. For example, processors 200 may include a central processing unit (CPU), which may have one or more processing cores. Processors 200 may also include one or more graphics processing units (GPU's), and/or additional processors. Processors 200 may be configured for multi-threaded processing. Processors 200 and/or operating system 190 may divide tasks among different processors or processor cores according to various criteria, and various tasks or portions of tasks may also be divided among different layers of software and hardware.

Memory 202, in various examples, may be configured to store information within computing device 10 during operation. Memory 202, in various examples, may include a computer-readable storage medium. In various examples, memory 202 is a temporary memory, and computing device 10 relies more on one or more data storage devices 206 than memory 202 for long-term storage. Memory 202, in various examples, may be a volatile memory, meaning that memory 202 may not maintain stored contents for a long duration of time once it is powered down, such as when computing device 10 is turned off. Examples of volatile memories that may characterize memory 202 include random access memories (RAM), dynamic random access memories (DRAM), static random access memories (SRAM), and other forms of volatile memories. In various examples, memory 202 may be used to store program instructions for execution by processors 200. Memory 202, in various examples, may be used by software or applications running on computing device 10 to temporarily store data and/or software code during execution of an application.

One or more data storage devices 206, in various examples, may include a computer-readable storage medium or multiple computer-readable storage media. Data storage devices 206 may be configured to store larger amounts of information than memory 202. Data storage devices 206 may further be configured for long-term storage of information. In various examples, data storage devices 206 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 202 may also be configured for long-term data storage, and any of a variety of technologies may blur the lines between memory and data storage, and between volatile and non-volatile. Memory 202 and data storage devices 206 may also include different levels of caches and any of various buffers or other temporary memories that may be incorporated at any of various levels of a processing architecture and with various latency and capacity profiles, including a dedicated cache exclusive to a processing core or processing chip, for example.

Computing device 10, in various examples, may also include a network interface 204. Computing device 10, in one example, utilizes network interface 204 to communicate with external devices, such as servers or data centers, via one or more networks, which may include one or more wireless networks. Network interface 204 may be or include a network interface card, such as an Ethernet card, an optical transceiver, a radio frequency transceiver, or any other type of component that is configured to send and receive information. Other examples of such network interfaces may include Bluetooth®, 3G, 4G, LTE, and WiFi® radios configured for mobile computing devices, as well as USB. In various examples, computing device 10 may use network interface 204 to communicate wirelessly with an external device such as a server or data center that may provide data to computing device 10.

Computing device 10, in various examples, may also include one or more input and/or output devices such as presence-sensitive display 12. Presence-sensitive display 12 may include a liquid crystal display (LCD) display screen or display screen that uses another type of graphical output technology. Presence-sensitive display 12 may also be a touchscreen, that may include an electrically capacitive layer sensitive to the presence of touch and configured to translate the positions of touch gesture inputs, and the motions of touch gesture inputs as they change position over time, into signals to provide to a driver for the touchscreen or other feature for receiving the information on the gesture inputs. Presence-sensitive display 12 may also be another type of touch-sensitive or otherwise presence-sensitive display in other examples.

Computing device 10 may also include or be configured to connect with any of a variety of other input and/or output devices such as speakers, microphones, physical buttons, a physical keyboard, a mouse, a touchpad, a trackball, a voice user interface system, an acoustic vibration component, a sound card, a video graphics adapter card, a video camera connected to a video gesture input interpretation system, or any other type of device for detecting and/or interpreting inputs from a user or for converting a signal into a form of graphical, audio, tactile, or other form of user output that can be sensed by a user.

Computing device 10, in various examples, may include one or more power sources 208, which may be rechargeable and provide power to computing device 10. Power source 208, in various examples, may be a lithium-ion battery, a nickel-cadmium battery, a nickel-metal hydride battery, or other suitable power source.

Figure 3:
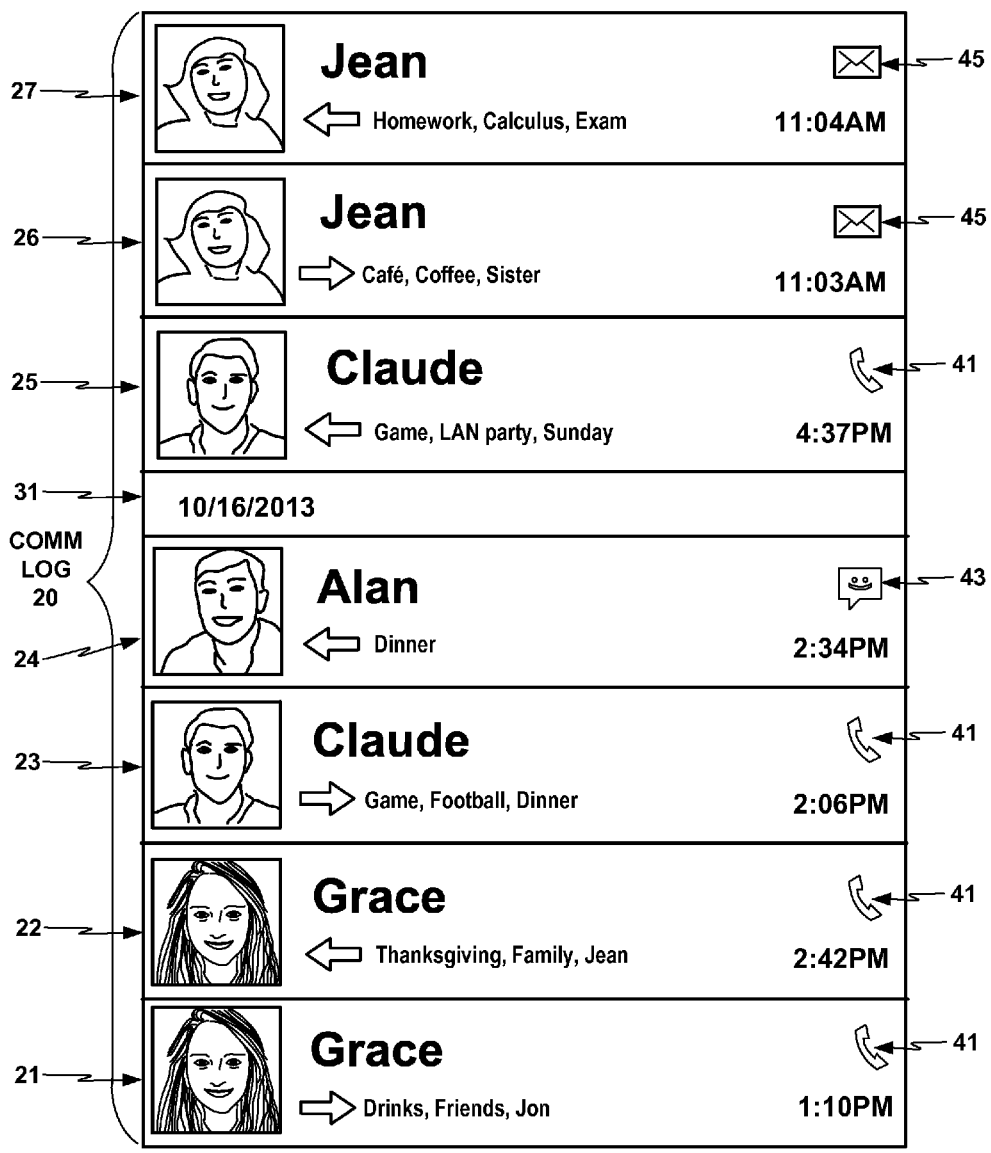
FIG. 3 depicts an example communication log, including example communication log entries, displayed at a presence-sensitive display of the example computing device shown in FIG. 1, in accordance with illustrative aspects of this disclosure.

FIG. 3 depicts an example communication log 20, including example communication log entries 21-27, displayed at a presence-sensitive display 12 of computing device 10 shown in FIG. 1, in accordance with illustrative aspects of this disclosure. Comparing FIG. 3 to FIG. 1 shows communication log entry 27 in full in FIG. 3 as opposed to partially scrolled out of view and obscured in FIG. 1, which shows that communication log 20 may be scrollable in communication application GUI 14, and may include hundreds, thousands, or any number of communication log entries, of which communication log entries 21-27 are only an illustrative sample. (Reference numbers 21-27 are depicted outside of GUI 14 in FIG. 3 to emphasize that they are not part of the displayed content.) The communication log entries in communication log 20 may also be searchable, including by keyword, as well as by criteria such as date, time, contact, communication type, and whether the communication is incoming or outgoing, or any other combination of these search criteria.

As shown in FIG. 3, communication log entries 21-27 each include a graphic depiction of what type of communication the communication log entry is based on, such as a phone call, a text message, or an email. Communication log entries 21-23 and 25 each include a telephone icon 41, indicating that these communication log entries are based on phone calls. Communication log entry 24 includes a text message icon 43, indicating that communication log entry 24 is based on a text message. Communication log entries 26 and 27 each include an email icon 45, indicating that these communication log entries are based on emails. In one example implementation, if a text message (or an email) was only one or two words in length or was otherwise very short, communication log entries for the text message (or the email) may simply reproduce the text message (or email) itself as the keyword or keywords. In other implementations, a communication log may be simply a call log that includes only call log entries for telephone calls. Communication log 20 also includes a date caption 31 indicating the date corresponding to each of the communication log entries listed below it, and each of the communication log entries 21-27 includes a time corresponding to the communication. Additional features of the communication log entries are described with reference to FIG. 4.

Figure 4:
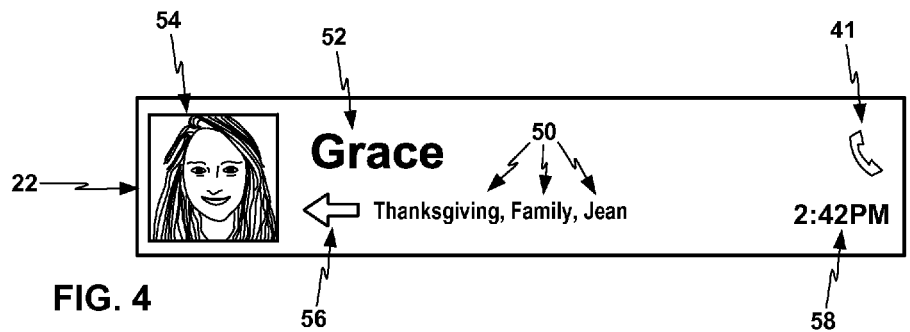
FIG. 4 depicts an example of a single communication log entry from a communication log, in accordance with illustrative aspects of this disclosure.

FIG. 4 depicts an example of a single communication log entry 22 from a communication log 20, including the telephone icon 41, in accordance with illustrative aspects of this disclosure. Communication log entry 22 includes a graphical depiction of a set of keywords 50 extracted from the phone call with which the communication log entry 22 is associated. The keywords 50 are in a graphical depiction in communication log entry 22 simply in that computing device 10 generates a visual output for display to the user, which the user may perceive as depicting the keywords. The particular keywords 50 may have been extracted and selected as keywords representing or evoking the conversation in the associated phone call because they may have been repeated during the phone call, and they may be relatively uncommon in the language, for example. Communication log entry 22 also includes a graphic depiction of a name 52 associated with the other participant of the phone call on which communication log entry 22 is based. At or around the time of the phone call, computing device 10 may have detected identifying information of the other phone call participant, such as the other phone call participant's phone number, and compared it with a contact list stored in storage devices 206 or otherwise accessible to computing device 10, and associated the indicated name 52 as stored in association with that phone number, with the communication log entry 22.

The contact list may have stored therein an image associated with the other phone call participant. Computing device 10 may display this photo in the communication log entry, as in the case of communication log entry 22, which includes a photographic image 54 associated with the other phone call participant in the associated phone call. Communication log entry 22 also includes an arrow icon 56 which indicates that the associated phone call was an outgoing phone call. Referring again to FIG. 3, each of the depicted example communication log entries 21-27 include an arrow icon that graphically indicates whether the associated communication was an outgoing or incoming communication. In particular, as shown in FIG. 3, communication log entries 21 and 23 are for incoming phone calls, communication log entry 24 is for an outgoing text message, communication log entry 25 is for an outgoing phone call, communication log entry 26 is for an incoming email, and communication log entry 27 is for an outgoing email.

With reference again to FIG. 4, communication log entry 22 also includes a graphical indication of the time at which the associated phone call was initiated. Each of the communication log entries communication log 20 also include a graphical indication of the time at which the associated communication was initiated or received. This is in combination with date caption 31 in FIG. 3, which graphically indicates the date for all the communication log entries listed under it. In another implementation, each individual communication log entry may include graphical indications of both the date and time, for example.

In one illustrative implementation, computing device 10 may select just one or a small number of keywords to display in an individual communication log entry 22 in the communication log 20, such as the three keywords displayed in communication log entry 22, while computing device 10 may store additional keywords for the associated conversation. For example, computing device 10 may enable each communication log entry in the communication log to be selected for expansion, so that if a user selects communication log entry 22 for expansion, for example, computing device 10 may then output an expanded form of communication log entry 22 that includes additional retained keywords beyond those displayed in the non-expanded format of communication log entry 22 as included in communication log 20. Computing device 10 may also provide user options for how many keywords to store for each phone call, and whether or not to enable expanded format communication log entries. Computing device 10 may therefore respond to a user input to expand a communication log entry by expanding the graphical depiction of the one or more keywords to include additional keywords that may also be based on the speech input from a phone call. Any particular speech input included in a phone call, or any or all of the collective audio inputs received in a phone call, may be considered to be a speech input for any purpose in this disclosure, in various examples.

As noted above, when someone calls the user's computing device and that caller has a log entry in the communication log, the computing device may display the keywords from the last conversation along with the caller ID while the computing device is ringing or otherwise notifying of an incoming phone call. This may enable the user to glance at the log entry keywords displayed along with the caller ID, and quickly be reminded of the last conversation with the current caller before answering the phone. This is depicted in FIG. 5.

Figure 5:
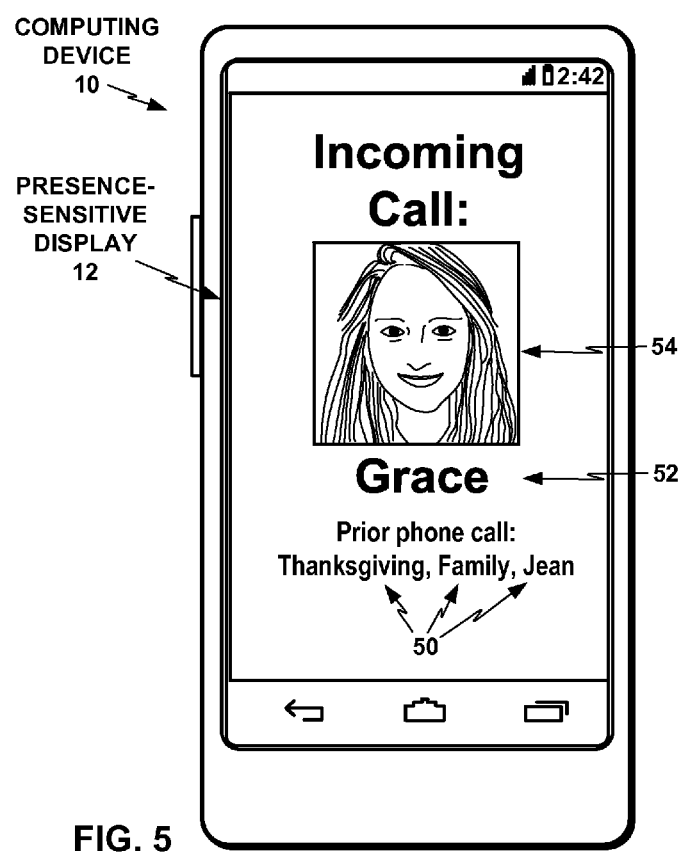
FIG. 5 depicts an example of a computing device that may be configured to receive an incoming phone call from a contact and to output a graphical depiction of stored keywords associated with a previous phone call with the contact as part of the caller identification for the incoming phone call, in accordance with illustrative aspects of this disclosure.

FIG. 5 depicts an example of a computing device 10 that may be configured to receive an incoming phone call from a contact and to output a graphical depiction of stored keywords 50 associated with a previous phone call with the contact as part of the caller identification for the incoming phone call, in accordance with illustrative aspects of this disclosure. Computing device 10 outputs the graphical depiction of the one or more of the keywords 50 in response to computing device 10 receiving an incoming telephone call from a device associated with the contact. That is, computing device 10 may have stored identifying information from a previous phone call, such as a phone number, an International Mobile Equipment Identity (IMEI) number, etc., associated with a device with which computing device 10 had a connection in the previous phone call.

Computing device 10 may recognize the same identifying information associated with the newly incoming phone call, and may display information associated with this device as a caller ID while the phone call is incoming. Computing device 10 may also have contact information stored in association with the identifying information for the device, or for multiple devices, so that computing device 10 may also display customized information related to the contact, rather than merely a phone number, for the caller ID. This is the case in the example depicted in FIG. 5, wherein computing device 10 displays a graphical indication of the contact's name 52 and a graphical depiction of an image associated with the contact 54. In other examples, computing device 10 may have keywords stored in association only with a phone number, IMEI, or other identifying information without any associated contact information, and computing device 10 may display the keywords in association with just the phone number or other information identified for an incoming phone call.

As depicted in FIG. 5, computing device 10 also outputs a graphical depiction of one or more keywords 50 stored from the previous conversation. Computing device 10 outputs the keywords in the form of a graphical rendering or display of text in the example of FIG. 5. Referring also to FIG. 2, one or more processors 200 of computing device 10 may also output the keywords, or data encoding a graphical depiction of the keywords, along with other caller ID data, to presence-sensitive display 12, or to any other display device. Presence-sensitive display 12 or any other display device may then output the keywords, or a graphical depiction of the keywords, in that they respond to receiving the data or the signal from one or more processors 200 by displaying or rendering a visually perceptible depiction of the keywords.

By displaying keywords 50 from the user's previous conversation with the contact as part of the caller ID, as depicted in FIG. 5, computing device 10 may rapidly remind the user of the previous conversation. The user may then glance at the keywords 50 along with the contact's name 52 and image 54 in the display of the caller ID, within the time it might take for the user to see and consider the caller ID and then answer the incoming phone call, and recall the content of the previous phone call. Computing device 10 executing communication log application 120 may therefore help the user to be more prepared for the new incoming phone call with the contact, and potentially to follow up on the subjects discussed in the previous phone call as needed or to resume discussion of the previously discussed subjects more thoughtfully, or without an awkward pause while the user stirs her memory.

As noted above, while various examples are discussed illustratively in terms of a phone call as an example of an audio communication, techniques of this disclosure may also be applied to any other type of audio communication involving one or more computing devices or other devices. Various examples applicable to phone calls or other audio communications may be performed by computing devices such as desktop or laptop computers, tablet computing devices, or wearable computing devices having a wearable form factor such as a wristwatch, glasses, or headset form factor, for instance. Any of these or other types of computing devices may perform keyword extraction techniques and other aspects as disclosed herein. Computing devices may apply techniques of this disclosure to an audio communication in the form of a phone call, a network-based audio web application session, an audio portion of a network-based audio/video web application session, or any other audio communication. The audio communication may be any session or instance of any type of web application configured for enabling or communicating a conversation among two or more users or callers. These may include voice chat through a chat or email web application, combined voice and video web applications, Session Initiation Protocol (SIP) phone calls, any other Voice over Internet Protocol (VoIP) communications, or any other audio communications facilitated by a computing device.

Figure 6:
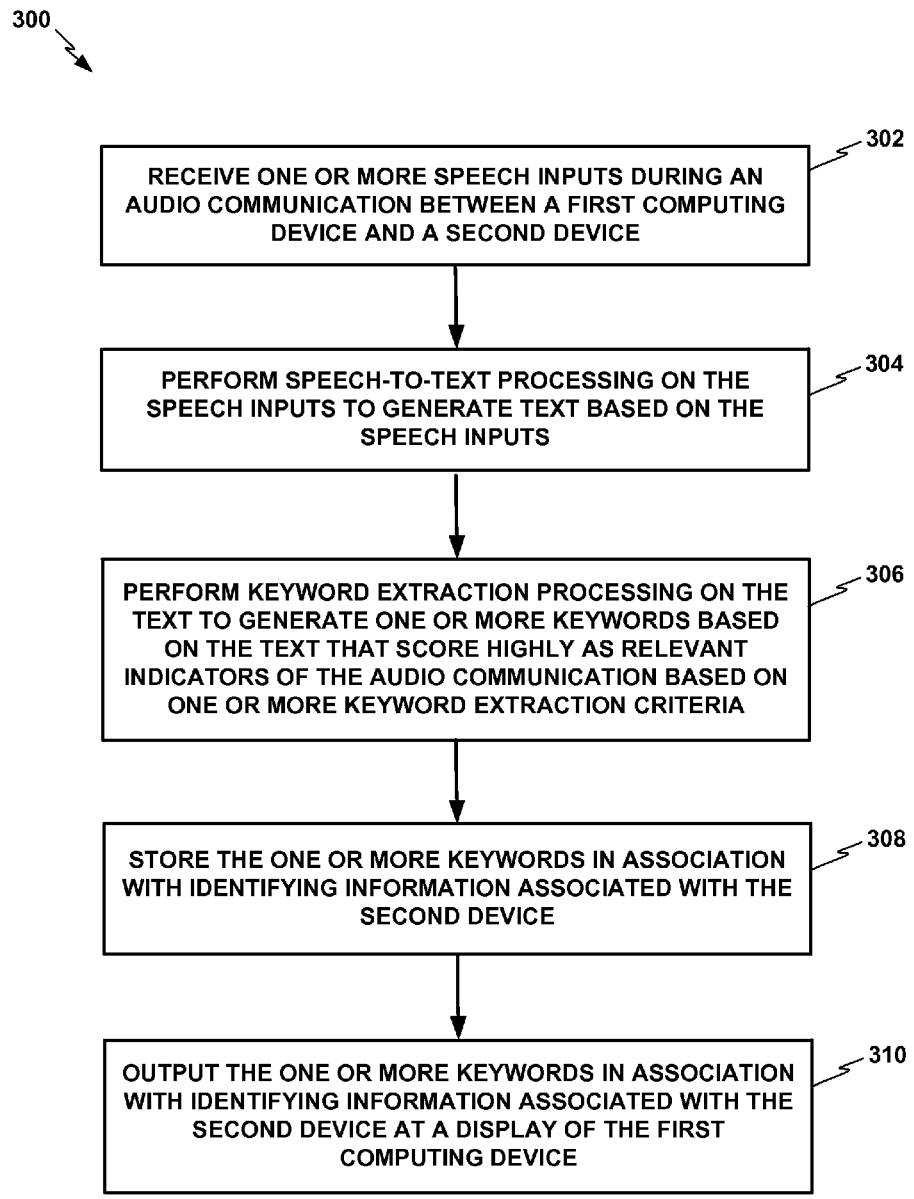
FIG. 6 is a flow diagram illustrating an example process that may be performed by a computing device to provide a communication log with keywords associated with the log entries, in accordance with illustrative aspects of this disclosure.

FIG. 6 is a flow diagram illustrating an example process 300 that may be performed by a computing device, such as computing device 10 of FIGS. 1 and 2 and/or any one or more processors 200 of computing device 10, to perform keyword extraction on an audio communication and provide a communication log with keywords associated with the log entries, in accordance with illustrative aspects of this disclosure. Process 300 is only one example, and other implementations may include more or fewer elements or features than those depicted in FIG. 6, or the same elements or features in a different arrangement.

In process 300, a computing device 10 or processor(s) 200 thereof may execute instructions, such as those of keyword communication log application 120. In this example, making reference to elements of the earlier figures, first computing device 10 receives one or more speech inputs during an audio communication between the first computing device 10 and a second device (302), where the second device may be the device used by the contact. Computing device 10 may receive some of the one or more speech inputs from the user of computing device 10 such as via microphone 210, which may receive acoustic vibrations and respond by transmitting an audio signal based on the acoustic vibrations to other components such as one or more processors 200. Computing device 10 may also receive some of the one or more speech inputs from the second device, in audio signals with which the second device conveys the contact's speech inputs to computing device 10. The second device, i.e., the contact's or other caller's device, may also be a computing device such as a smartphone, tablet, laptop computer, etc., or may be any other device capable of communicating audio signals conveying the contact's speech inputs, such as a traditional land-line telephone, for example.

Computing device 10 may also perform speech-to-text processing on the one or more speech inputs received by computing device 10 to generate text based on the one or more speech inputs (304). For example, one or more processors 200 of computing device may perform speech-to-text processing executing instructions comprised in any one or more of communication log application 120, speech-to-text processing application 122, telephony manager 132, communication framework 182, or operating system 190 to process the speech input and generate a text based on the speech input.

Computing device 10 may also perform keyword extraction processing on the text to generate one or more keywords based on the text, that score highly as relevant indicators of the audio communication, based on one or more keyword extraction criteria (306). For example, one or more processors 200 of computing device may perform keyword extraction processing executing instructions comprised in any one or more of communication log application 120, keyword extraction processing application 124, telephony manager 132, communication framework 182, or operating system 190 to generate one or more keywords based on the text. The keyword extraction criteria may include any one or more of: how relatively uncommon a word is in a language; how many times a word is used in the one or more speech inputs; what other words a word is used with; whether a word is used by at least two participants in the conversation; and how many times the word is used as part of a phrase, and how relatively uncommon the phrase is, any other example discussed above, or any other keyword extraction criterion.

Computing device 10 may also store the one or more keywords in association with identifying information associated with the second device (308). For example, one or more processors 200 of computing device 10 may store the one or more keywords in association with identifying information associated with the second device on one or more data storage devices 206, and/or in memory 202, and/or on any other data storage or memory component on a separate or remote resource in at least temporary operable connection with computing device 10. Computing device 10 may also output the one or more keywords, in association with identifying information associated with the second computing device, at a display of the first computing device (310). For example, one or more processors 200 of computing device 10 may execute instructions comprised in any one or more of communication log application 120, telephony manager 132, communication framework 182, or operating system 190 to identify a contact as a remote participant in the telephone call or other audio communication. One or more processors 200 of computing device 10 may identify the contact by identifying information associated with the contact's device or an account of the contact's, such as a phone number, an IMEI, a subscriber identity module (SIM) card serial number, an international mobile subscriber identity (IMSI) number, an Internet Protocol (IP) address, SIP configuration data, an email account name or other online account identifier, or other identifying information for a device with which a connection is established for the phone call or other audio communication, with information for a contact stored in a contact list application on computing device 10. One or more processors 200 of computing device 10 may then associate the one or more keywords with the contact.

This may also include computing device 10 outputting a graphical depiction of the one or more keywords at a display of the computing device, such as at presence-sensitive display 12. Outputting the graphical depiction of the one or more keywords may include one or more processors 200 outputting a signal for a graphical depiction of the one or more keywords to a display for the display to render, for example. Outputting the graphical depiction of the one or more keywords may also include presence-sensitive display 12 graphically rendering the graphical depiction of the one or more keywords. Outputting the graphical depiction of the one or more keywords may also include outputting graphical depictions in the form of communication log 20 and/or communication log entries 21-27 as depicted in FIGS. 1,3, and 4, and in the caller ID depicted in FIG. 5, that include graphical depictions of one or more keywords. Outputting the graphical depiction of the one or more keywords may also include outputting identifying information for the contact together with the one or more keywords, such as in the communication log entries 21-27 in FIGS. 1,3, and 4, and in the caller ID depicted in FIG. 5. Computing device 10 may further perform any of the functions and processes described above with reference to FIGS. 1-5. In other examples, computing device 10 may omit or vary one or more aspects of process 300 as shown in FIG. 6, or perform them in a different order, or perform additional actions beyond those shown in FIG. 6.

Various techniques described herein may be implemented in software that may be written in any of a variety of languages, making use of any of a variety of toolsets, frameworks, APIs, programming environments, virtual machines, libraries, and other computing resources, as indicated above. For example, software code for various implementations may be written in Java, C, Objective-C, C#, C++, Go, JavaScript, Dart, Python, Ruby, Clojure, assembly language, machine code, or any other language. As one specific illustrative example, aspects of the disclosure discussed above may be implemented in a software module written in Java that is executable on virtual machine 198 of FIG. 2, for example.

Aspects of the disclosure may be equally applicable and implemented in any computing device or any operating system, and using any other APIs, frameworks, or toolsets. Aspects are described herein for decoding and processing of data for virtual keyboard inputs and responsive haptic feedback, which may interact with any other data store or application. When implemented in software or firmware, various techniques disclosed herein may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that may comprise non-transitory media. The term "non-transitory" may indicate that the storage medium is not embodied in a carrier wave or a propagated signal. In certain examples, a non-transitory storage medium may store data that can, over time, change (e.g., in RAM or cache). Data storage devices may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format. In some examples, executable instructions may not be stored permanently in the local data storage comprised in a computing device and may be received temporarily from an external resource, such as from a web service, data center, and/or other server-side resource, yet those executable instructions may still be buffered, cached, or otherwise stored temporarily in a buffer memory, cache memory, processor registers, or other temporary memory comprised in the computing device. In these examples, the computing device may still comprise a computer-readable storage medium on which the executable instructions are stored, even if only temporarily.

Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSP's), general purpose microprocessors, application-specific integrated circuits (ASIC's), field-programmable gate arrays (FPGA's), or other integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1-6, as well as additional embodiments, are within the scope of one or more of the following claims.

What is claimed is:

1. A method comprising:
    receiving, by a first computing device, one or more speech inputs during a conversation associated with a particular audio communication between the first computing device and a second device, wherein the first computing device stores identifying information associated with a contact associated with the second device, the identifying information comprising a name of the contact and an image associated with the contact;
    performing, by the first computing device, speech-to-text processing on the one or more speech inputs to generate text based on the one or more speech inputs;
    performing, by the first computing device and based on one or more keyword extraction criteria, keyword extraction processing on the text to generate one or more keywords that are relevant indicators of the conversation associated with the particular audio communication, wherein the one or more keyword extraction criteria comprise at least one criterion related to whether a word is used by at least two participants in the conversation;
    storing, by the first computing device, the one or more keywords; and
    outputting, by the first computing device and for display, a graphical representation of the one or more keywords in association with the identifying information comprising the name of the contact and the image associated with the contact.

2. The method of claim 1, further comprising outputting the graphical representation in a communication log entry that also comprises one or more additional graphical representations comprising one or more keywords that are relevant indicators of conversations from one or more additional audio communications, in association with identifying information comprising a name of a contact and an image associated with the contact for each of the one or more additional audio communications.

3. The method of claim 2, wherein the communication log entry further comprises an indication of a time when the particular audio communication was initiated.

4. The method of claim 2, wherein the communication log entry further comprises a graphical indication of whether the particular audio communication was initiated or received by the first computing device.

5. The method of claim 1, further comprising outputting the graphical representation in response to the first computing device receiving an incoming audio communication from the second computing device.

6. The method of claim 1, wherein the image associated with the contact comprises a photographic image of the contact.

7. The method of claim 1, wherein the particular audio communication comprises a telephone call.

8. The method of claim 1, wherein the particular audio communication comprises a network-based audio communication session.

9. The method of claim 1, wherein the particular audio communication comprises an audio portion of a network-based audio/video web application session.

10. The method of claim 1, wherein outputting the graphical representation comprises outputting the graphical representation in a call log based on a history of audio communications.

11. The method of claim 1, wherein outputting the graphical representation comprises outputting the graphical representation in a communication log based on a history of both audio communications and text-based messages comprising at least one of email messages and Short Message Service (SMS) text messages.

12. The method of claim 11, further comprising performing keyword extraction processing to one or more of the text-based messages to generate one or more keywords based on each of the one or more text-based messages, and wherein the method further comprises:
    for each of the one or more text-based messages, outputting in the communication log an indication of a contact identified with the respective text-based message in association with the one or more keywords based on the text-based message.

13. The method of claim 11, wherein the communication log is searchable by the one or more keywords as extracted from previous telephone calls.

14. The method of claim 1, further comprising responding to a user input by expanding the graphical depiction to include additional keywords based on the one or more speech inputs.

15. The method of claim 1, wherein performing the keyword extraction processing comprises identifying a plurality of keyword candidates from the text, and wherein generating the one or more keywords comprises selecting a subset of the keyword candidates to be the one or more keywords.

16. The method of claim 1, wherein the keyword extraction criteria comprise at least one criterion related to how relatively uncommon a word is in a language.

17. The method of claim 1, wherein the conversation associated with the particular audio communication is a most recent conversation with the contact, and the one or more keywords are relevant indicators of the most recent conversation with the contact.

18. The method of claim 17, wherein outputting, by the first computing device and for display, the graphical representation of the one or more keywords in association with the identifying information comprising the name of the contact and the image associated with the contact, further comprises:
  outputting the graphical representation while the computing device is receiving an incoming audio communication from the second device, such that the one or more keywords of the graphical representation outputted for display while the computing device is receiving the incoming audio communication from the second device, are relevant indicators of the most recent conversation with the contact.

19. The method of claim 1, wherein the keyword extraction criteria comprise at least one criterion related to how many times a word is used as part of a phrase and how relatively uncommon the phrase is.

20. The method of claim 1, wherein the keyword extraction criteria comprise at least one criterion related to how many times a word is used in the one or more speech inputs.

21. The method of claim 1, wherein the keyword extraction criteria comprise at least one criterion related to what other words a word is used with.

22. A computing device, comprising:
  at least one processor;
  a computer-readable storage medium; and
  machine-readable instructions stored on the computer-readable storage medium, the machine-readable instructions being executable by the at least one processor to:
   receive one or more speech inputs during a conversation associated with a particular audio communication between the computing device and a contact associated with the second device, the identifying information comprising a name of the with the second device, the identifying information comprising a name of a contact and an image associated with the contact;
   perform speech-to-text processing on the speech input to generate text based on the one or more speech inputs;
   perform, based on one or more keyword extraction criteria, keyword extraction processing on the text to generate one or more keywords that are relevant indicators of the conversation associated with the particular audio communication, wherein the one or more keyword extraction criteria comprise at least one criterion related to whether a word is used by at least two participants in the conversation;
   store the one or more keywords; and
   output, for display, a graphical representation of the one or more keywords and a of the identifying information comprising the name of the contact and the image associated with the contact.

23. The computing device of claim 22, wherein the machine-readable instructions are further executable by the at least one processor to:
  output, for display, the graphical representation of the one or more of the keywords and of the identifying information comprising the name of the contact and the image associated with the contact, in response to the computing device receiving an incoming audio communication from the second device.

24. A computer-readable storage device comprising executable instructions for causing at least one processor to:
  receive one or more speech inputs during a conversation associated with a particular audio communication between a first computing device and a second device, wherein the first computing device stores identifying information associated with a contact associated with the second device, the identifying information comprising a name of the contact and an image associated with the contact;
  perform speech-to-text processing on the speech input to generate text based on the one or more speech inputs;
  perform, based on one or more keyword extraction criteria, keyword extraction processing on the text to generate one or more keywords that are relevant indicators of the conversation associated with the particular audio communication, wherein the one or more keyword extraction criteria comprise at least one criterion related to whether a word is used by at least two participants in the conversation;
  store the one or more keywords; and
  output, for display, a graphical representation of the one or more keywords and of the identifying information comprising the name of the contact and the image associated with the contact.

* * * * *